United States Patent
Lee

(10) Patent No.: US 11,546,515 B2
(45) Date of Patent: Jan. 3, 2023

(54) METHOD AND APPARATUS OF CAMERA IMAGE CORRECTION USING STORED TANGENTIAL AND SAGITTAL BLUR DATA AND COMPUTER-READABLE RECORDING MEDIUM

(71) Applicant: Gramm Inc., Middletown, DE (US)

(72) Inventor: Jisoo Lee, Middletown, DE (US)

(73) Assignee: Gramm Inc., Middletown, DE (US)

( * ) Notice: Subject to any disclaimer, the term of this patent is extended or adjusted under 35 U.S.C. 154(b) by 0 days.

(21) Appl. No.: 17/245,646

(22) Filed: Apr. 30, 2021

(65) Prior Publication Data

US 2022/0353414 A1 Nov. 3, 2022

(51) Int. Cl.
*H04N 5/232* (2006.01)
(52) U.S. Cl.
CPC ............................. *H04N 5/23264* (2013.01)
(58) Field of Classification Search
CPC . H04N 5/23264; H04N 5/3572; H01J 29/566; H01J 29/56; H01J 3/12
USPC ...................................................... 348/208.4
See application file for complete search history.

(56) References Cited

U.S. PATENT DOCUMENTS

2019/0378251 A1\* 12/2019 Hsu ........................... G06T 5/50

FOREIGN PATENT DOCUMENTS

JP 2015216576 \* 12/2015 ............. H04N 5/232

\* cited by examiner

*Primary Examiner* — Lin Ye
*Assistant Examiner* — Chan T Nguyen
(74) *Attorney, Agent, or Firm* — Saliwanchik, Lloyd & Eisenschenk

(57) ABSTRACT

Disclosed is an image correction method, implemented in an image correction apparatus that corrects an image taken by a camera, the method including: obtaining a first image by taking an image of a chart including a plurality of circles, each of which includes one or more regions of interest (ROIs) in a tangential direction and a sagittal direction, through the camera; selecting and storing tangential and sagittal image blur correction data of the camera, based on image blur data in the tangential and sagittal directions of the camera measured using the obtained first image; and loading the stored tangential and sagittal image blur correction data and applying the loaded tangential and sagittal image blur correction data to correction for a second image taken by the camera. Thus, image distortion due to, in particular, tangential and sagittal image blurs is effectively corrected by taking individual characteristics of the camera into account.

15 Claims, 12 Drawing Sheets

METHOD AND APPARATUS OF CAMERA IMAGE CORRECTION USING STORED TANGENTIAL AND SAGITTAL BLUR DATA AND COMPUTER-READABLE RECORDING MEDIUM

BACKGROUND OF THE INVENTION

(A) Field of the Invention

The disclosure relates to an image correction apparatus and method, and more particularly to an image correction apparatus and method based on tangential and sagittal image blur correction data of a camera.

(B) Description of the Related Art

An aberration causes an image to be distorted without focusing on one point when light comes from one point and makes an image through a lens or mirror.

The aberration is divided into a monochromatic aberration and a chromatic aberration. The monochromatic aberration refers to an aberration that occurs by a lens or mirror when light of a single wavelength is used. As the monochromatic aberration, there are a total of five aberrations such as a spherical aberration, coma and astigmatism, which cause an image to be blurred, and curvature of an image field and distortion, which cause an image to be distorted, and these aberrations are referred to as the Five Seidel Aberrations after Philipp Ludwig von Seidel who found and classified them.

Among the five aberrations, the astigmatism refers to a phenomenon that occurs due to different foci because there is a difference between focal distances of a lens in sagittal and tangential directions when rays of light not parallel to an optical axis are focused. Although a lens itself is rotationally symmetric, the astigmatism may appear in an image of an object point on an optical axis because rotational symmetry about the optical axis is broken when the position and orientation of the lens are not correctly aligned to the optical axis in a lens mounting process.

Thus, image distortion due to the aberration of the lens may cause an image taken by a camera to have low resolution, and image correction may be needed for inhibiting the resolution from being lowered.

However, such image correction has been uniformly performed without considering individual characteristics of cameras.

SUMMARY OF THE INVENTION

Accordingly, an aspect of the disclosure is to provide an image correction apparatus and method, in which individual characteristics of a camera are taken into account for performing image correction.

Another aspect of the disclosure is to provide an image correction apparatus and method, in which image distortion due to, in particular, tangential and sagittal image blurs is effectively corrected.

The problems to be solved by the disclosure are not limited to those mentioned above, and other unmentioned problems will become apparent to a person skilled in the art by the following descriptions.

A first aspect of the disclosure is achieved by providing an image correction method, implemented in an image correction apparatus that corrects an image taken by a camera, the method including: obtaining a first image by taking an image of a chart including a plurality of circles, each of which includes one or more regions of interest (ROIs) in a tangential direction and a sagittal direction, through the camera; selecting and storing tangential and sagittal image blur correction data of the camera, based on image blur data in the tangential and sagittal directions of the camera measured using the obtained first image; and loading the stored tangential and sagittal image blur correction data and applying the loaded tangential and sagittal image blur correction data to correction for a second image taken by the camera.

In this case, the tangential and sagittal image blur correction data may include: with respect to each of the plurality of circles, (i) a center position of the corresponding circle; (ii) center positions of one or more ROIs in the tangential direction and the sagittal direction, included in the corresponding circle, selectively; and (iii) one or more modulation transfer function (MTF) plots including MTF values at spatial frequencies.

Further, the one or more MTF plots may be generated based on (a) each of one or more ROIs in the tangential and sagittal directions or (b) average of one or more ROIs in the tangential direction and/or sagittal directions, included in each circle.

Further, each MTF plot of the one or more MTF plots may include part of the MTF plot including specific frequencies and MTF values corresponding to the specific frequencies, and the specific frequency value may include at least one of a ¼ Nyquist frequency, a ½ Nyquist frequency, and a Nyquist frequency.

Meanwhile, the tangential and sagittal image blur correction data may include: (i) an image size; (ii) an optical center position; and (iii) with respect to each of the plurality of circles, one or more MTF plots including an MTF average value of one or more ROIs in the tangential direction and/or sagittal direction at a ¼ Nyquist frequency.

Meanwhile, the tangential and sagittal image blur data may include: with respect to each of the plurality of circles, (i) a center position of the corresponding circle; (ii) center positions of one or more ROIs in the tangential direction and the sagittal direction, included in the corresponding circle, selectively; and (iii) one or more MTF plots including MTF values at spatial frequencies, the tangential and sagittal image blur correction data being stored as an image sharpening filter calculated based on the tangential and sagittal image blur data.

A second aspect of the disclosure is achieved by providing an image correction apparatus comprising: an image acquirer configured to obtain a first image by taking an image of a chart comprising a plurality of circles, each of which comprises one or more regions of interest (ROIs) in a tangential direction and a sagittal direction, through the camera; an image correction data generator configured to select and store tangential and sagittal image blur correction data of the camera, based on image blur data in the tangential and sagittal directions of the camera measured using the obtained first image; and an image correction processor configured to load the stored tangential and sagittal image blur correction data and apply the loaded tangential and sagittal image blur correction data to correction for a second image taken by the camera.

Further, a third aspect of the disclosure is achieved by providing a computer-readable recording medium recorded with a program for implementing the foregoing method.

A fourth aspect of the disclosure is achieved by providing a computer program stored in a medium, to implement the foregoing method as combining with hardware.

BRIEF DESCRIPTION OF THE DRAWINGS

The above and/or other aspects of the disclosure will become apparent and more readily appreciated from the following description of the exemplary embodiments, taken in conjunction with the accompanying drawings, in which.

DETAILED DESCRIPTION

Below, exemplary embodiments of the disclosure will be described in detail with reference to the accompanying drawings. However, the disclosure is not limited or restricted to the exemplary embodiments. Throughout the accompanying drawings, like numerals refer to like elements.

Although the terms first, second, etc. may be used herein to describe various elements, these elements are not limited by these terms. These terms are only used to distinguish one element from another. For example, a first element could be termed a second element, and, similarly, a second element could be termed a first element, without departing from the scope of the disclosure. The terminology used herein is for the purpose of describing particular embodiments only, and is not intended to limit the disclosure. Singular forms are intended to include plural forms as well, unless the context clearly indicates otherwise.

As the terminology used in the disclosure, general terms indicating the functions of the disclosure and currently used as widely as possible are selected. However, these terms may be varied depending on intension of those skilled in the art, the precedents, the advent of new technology, etc. In particular, an applicant may voluntarily choose terms, and in this case the meaning of these terms will be explained in detail in the corresponding description of the disclosure. Therefore, the terminology used in the disclosure should be defined based on not mere naming but its meaning and description made throughout the disclosure.

Throughout the disclosure, when a certain part includes a certain element, the term "includes" is intended to not exclude another element but include one or more additional elements unless otherwise specified.

In a digital camera and the like image taking apparatus, a test of resolution, which represent show sharply an edge of a taken image is reproduced without blurring, is one of the most important tests.

A modulation transfer function (MTF) refers to a method generally used for testing lens resolution of a camera, which uses a contrast function to measure spatial resolution, and more specifically a spatial frequency response of an image taking system, obtainable based on the Fourier Transform amplitude of a system impulse response, known as a point spread function (PSF).

As one of recent methods of measuring the resolution of the image taking apparatus, there is a slanted edge method in which even less data and fewer jobs are enough to provide a better approximate value to the MTF of a two-dimensional (2D) PSF of the camera lens in a tangential direction to an edge. In more detail, the slanted edge method is to project a 2D edge in the tangential direction to the edge to thereby generate an edge strength profile (an edge spread function or ESF); differentiate the edge strength profile to thereby derive a line spread function (LSF); and apply the Fourier Transform to the LSF to thereby obtain an MTF plot.

Figure 1A:
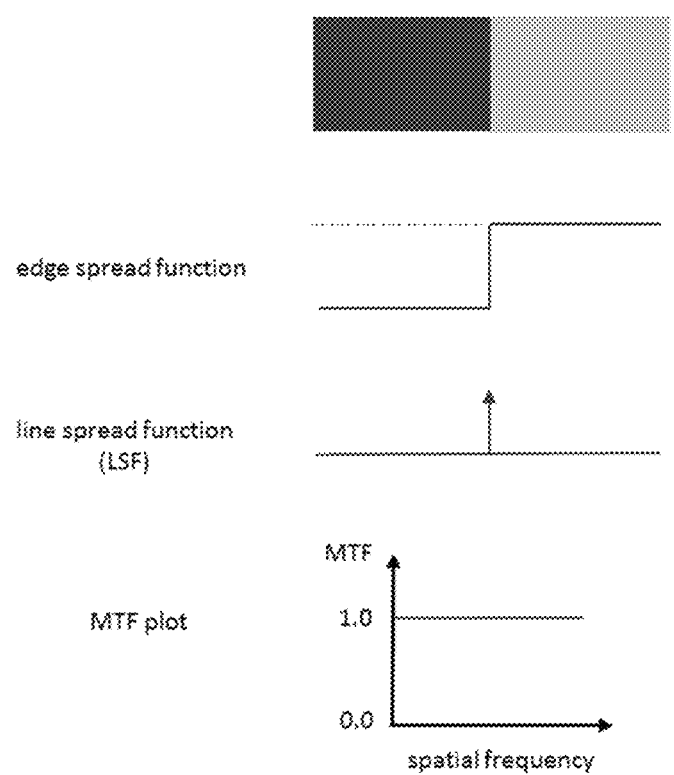
FIGS. 1A and 1B illustrate examples of modulation transfer function (MTF) plots based on a slanted edge method.
Figure 1B:
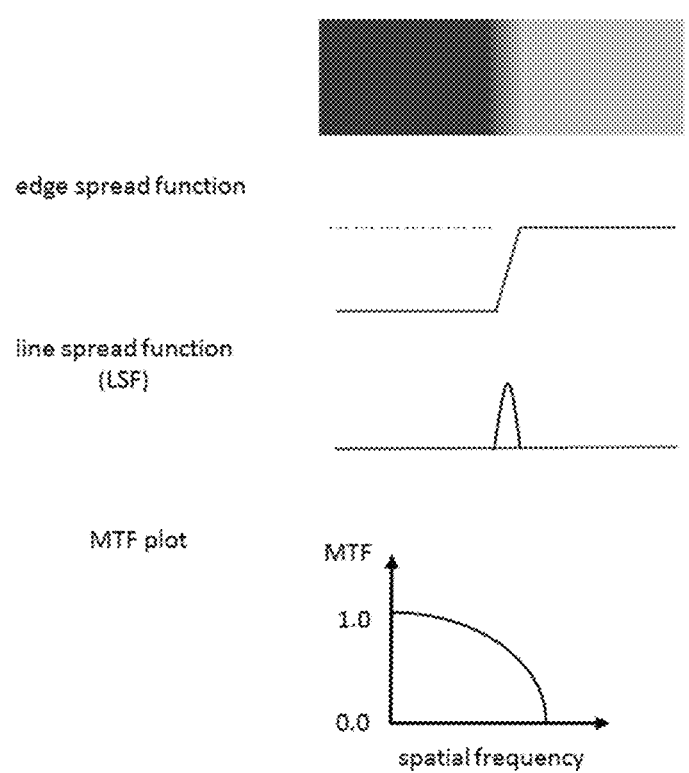

Referring to this, FIG. 1 illustrating examples of an MTF curves according to the foregoing method will be described. FIG. 1A shows an ideally clear edge without any blur, and FIG. 1B shows a relatively unclear edge with a blur.

As shown in FIG. 1A, in the case of the ideally clear edge without any blur, the ESF is given in the form of a step function when black is '0' or 'down' and when white is '1' or 'up', and is discontinuously changed at the edge, and thus the LSF becomes an impulse function and its Fourier Transform is plotted to have constant MTF values with regard to all spatial frequencies. On the other hand, as shown in FIG. 1B, in the case of the relatively unclear edge with a blur, the ESF is continuously changed at the edge with a certain extent of angle, and the MTF plot has MTF values varied depending on the spatial frequencies. Thus, it is possible to measure a resolution with reference to the MTF values corresponding to the spatial frequencies in the MTF plot, and further use the MTF value to clearly reproduce a taken image without a blur.

Figure 2:
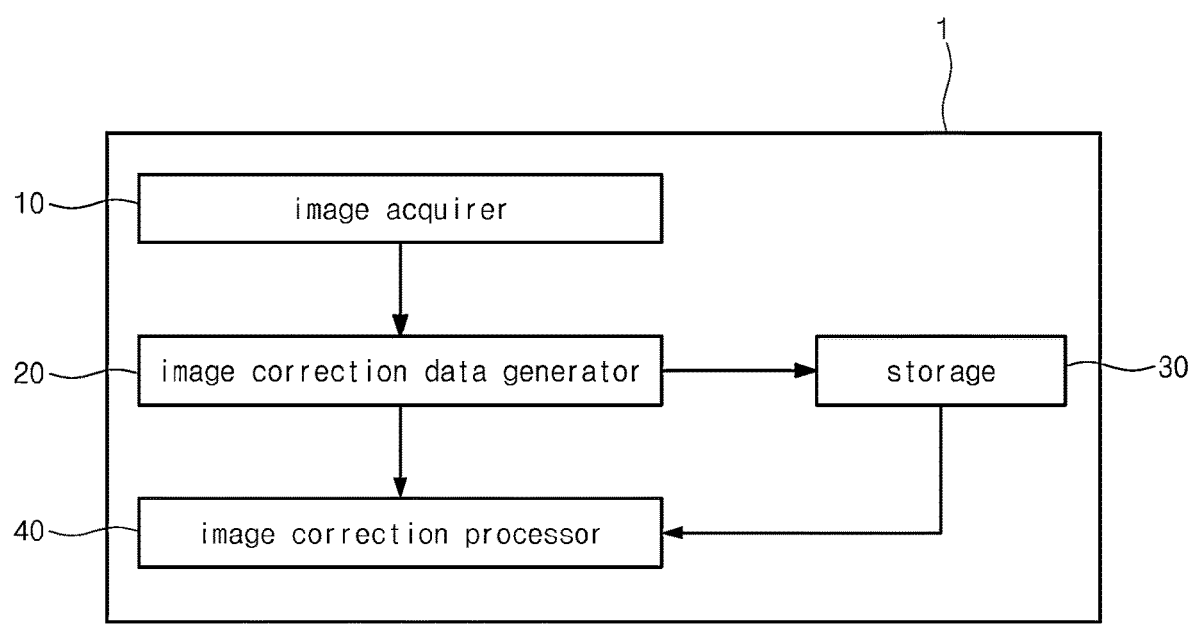
FIG. 2 is a block diagram of an image correction apparatus according to an embodiment of the disclosure.

FIG. 2 is a block diagram of an image correction apparatus according to an embodiment of the disclosure.

Referring to FIG. 2, an image correction apparatus 1 of the disclosure essentially includes an image acquirer 10 configured to acquire a first image through a camera; an image correction data generator 20 configured to measure and store blur data from the first image; and an image correction processor 40 configured to load and apply the stored blur data to correction for a second image.

The image acquirer 10 obtains the first image by taking a chart including a plurality of circles through the camera. In this case, the camera refers to an image taking apparatus that includes an optical system and is also used in taking an image, and means a camera as a test subject from which correction data is acquired to be used when the image acquired by the camera is subjected to correction.

Figure 4:
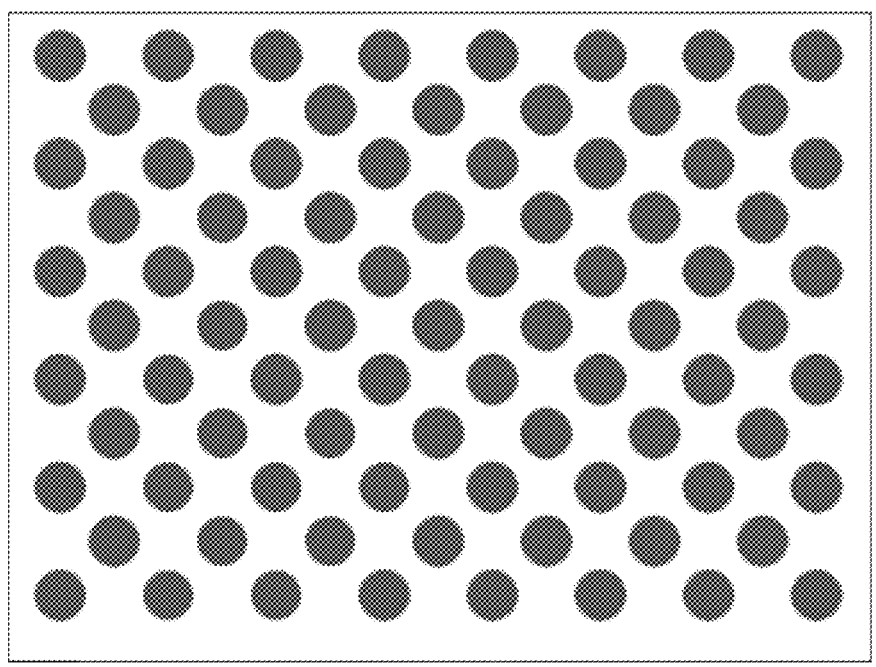
FIG. 4 is a chart according to an embodiment of the disclosure.
Figure 5:
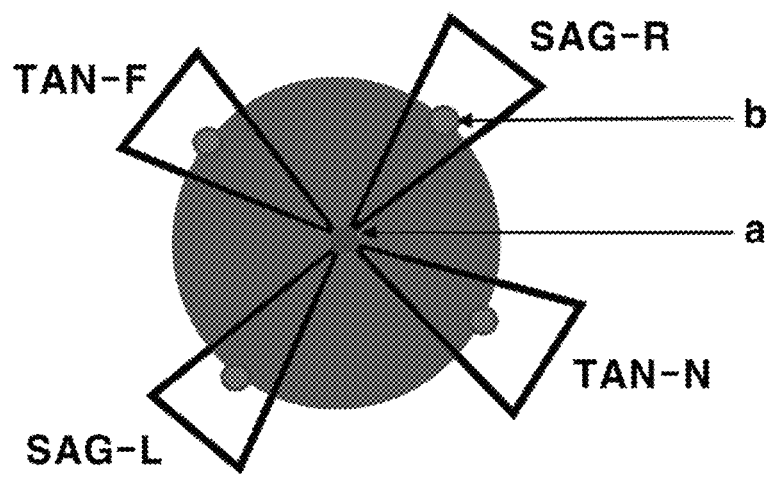
FIG. 5 illustrates one circle included in the chart of FIG. 4.

Here, the chart including the plurality of circles may be printed on paper or the like reflective medium or may be printed on a film or the like transparent medium, for example, as shown in FIG. 4. FIG. 4 shows a plurality of black circles on a white background, but the chart may include a plurality of white circles on a black background. Each circle in the chart may include four triangular regions of interest (ROI) as shown in FIG. 5. Thus, each circle may be partially printed with only the ROI. In this case, a point 'a' in the middle of the circle indicates the center of the circle, and a point 'b' in each middle of four ROIs indicates the center of the ROI. Among ROIs positioned in a tangential direction to an optical axis, the ROI far from the optical axis is represented with 'TAN-F', and the ROI near to the optical axis is represented with 'TAN-N'. Likewise, among ROIs positioned in a sagittal direction to the optical axis, the ROI on the right is represented with 'SAG-R, and the ROI on the left is represented with 'SAG-L'. In the drawings, four ROIs are shown, but there are no limits to the number of ROIs. Alternatively, fewer or more than four ROIs may be used as long as they are suitable for effectively correct a blur in the tangential direction and/or sagittal direction.

The image correction data generator 12 measures image blur data in the tangential and sagittal directions of the camera through the first image, and stores all or part of the image blur data in the storage 30.

In this case, the storage 30 may be a non-volatile memory provided inside the camera, for example, an electrically erasable and programmable read only memory (EEPROM) of a camera module, or a non-volatile memory provided outside the camera, for example, a text file including a serial number of the camera.

Figure 6:
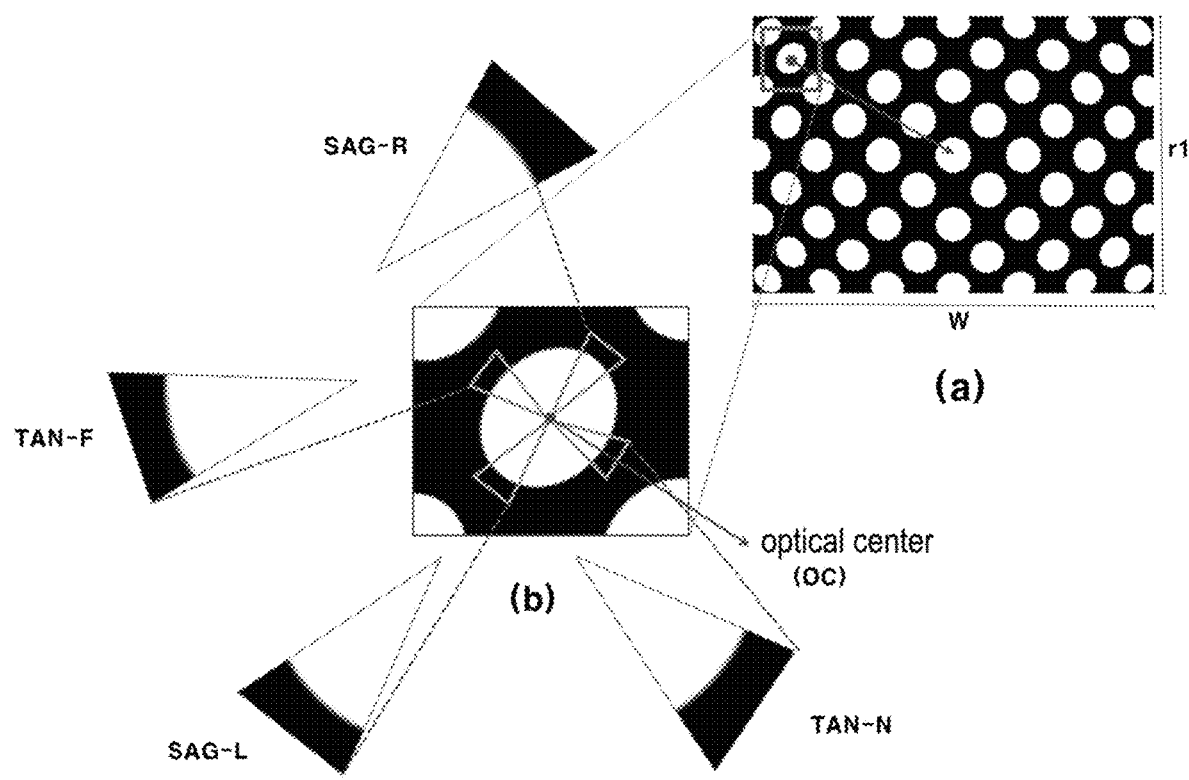
FIG. 6 illustrates an image of a chart taken by a camera and regions of interest (ROI) according to an embodiment of the disclosure.
Figure 7:
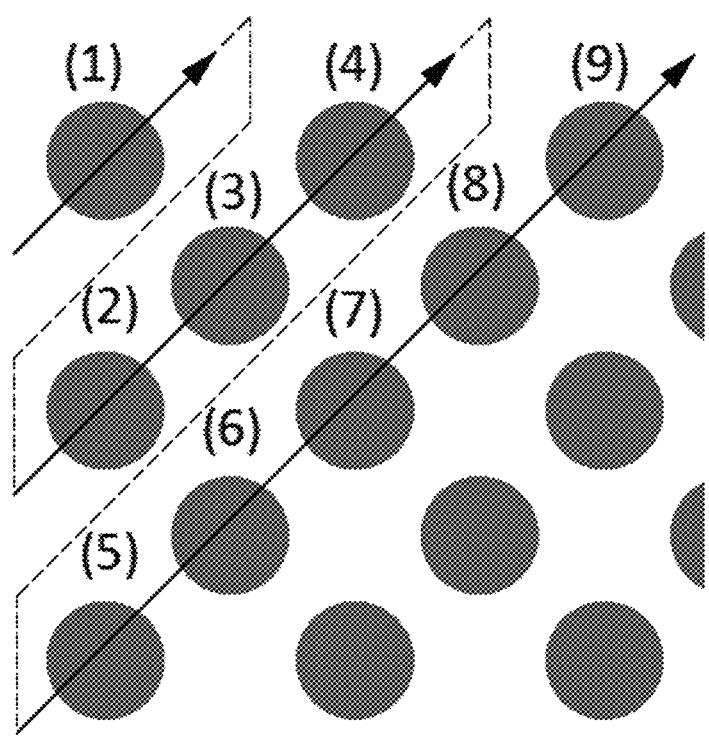
FIG. 7 illustrates an example of order of storing data related to circles included in an image according to an embodiment of the disclosure.
Figure 8:
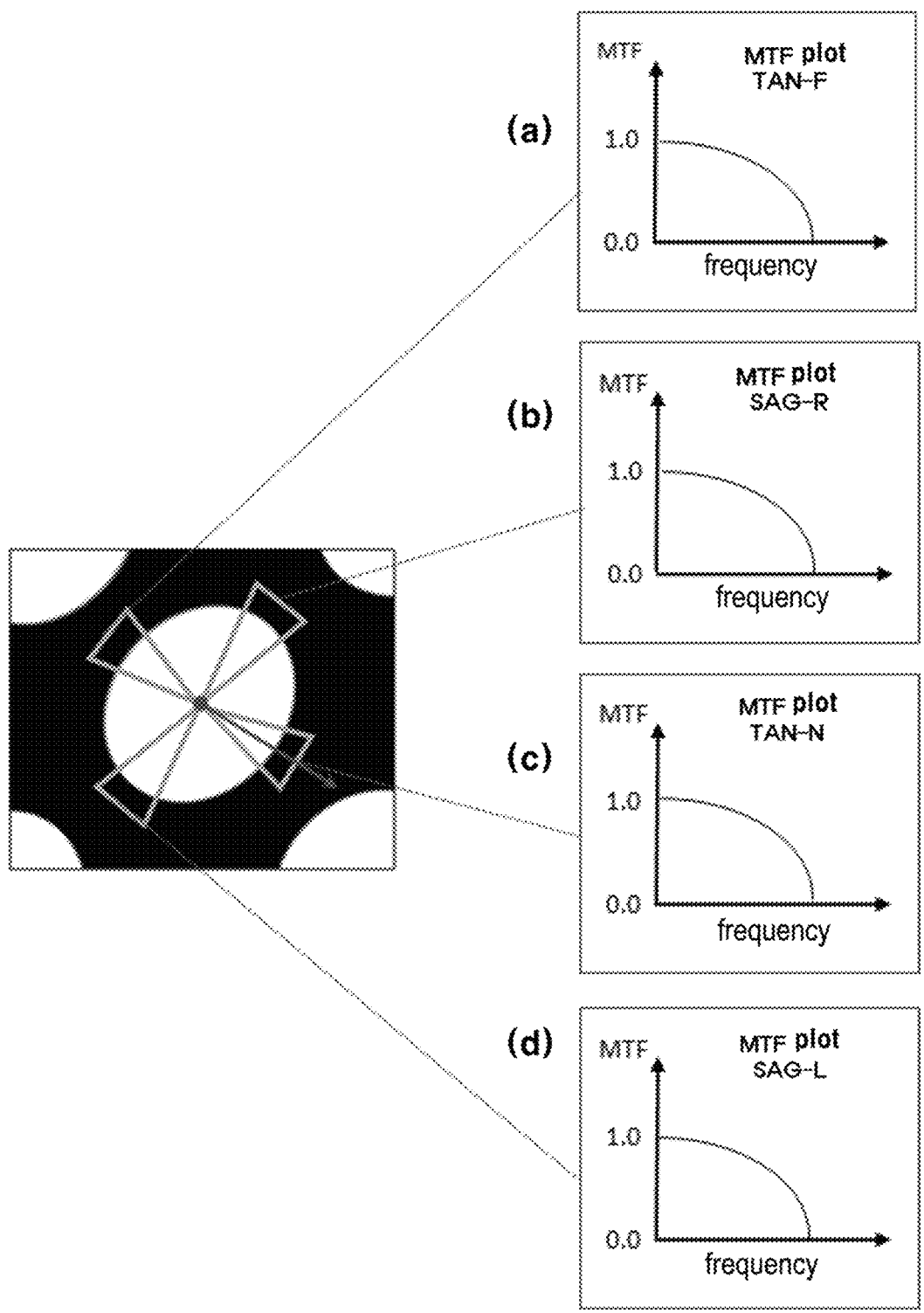
FIG. 8 shows MTF plots related to one circle included in an image according to an embodiment of the disclosure.

The image blur data will be described with reference to FIG. 6 showing an image (a) of a chart taken by the camera, and ROIs (b). In this case, the stored image blur data may include at least one piece of the following data, and the stored image blur data may be called image blur correction data:

1. The size of a taken image, i.e. a width (W) and a height (H),
2. The center position of each circle, which may for example be estimated based on a centroid, and represented with (x, y) coordinates within the size of the whole image. The order in which the center positions of the circles and/or the data related to the circles are stored may for example be defined as shown in FIG. 7.
3. The center position of each ROI included in each circle, which may for example be estimated based on a centroid, and represented with (x, y) coordinates within the size of the whole image. The order in which the center positions of the ROIs and/or the data related to the ROIs are stored may for example be defined in a clockwise or counterclockwise direction starting with a certain ROI, for example, from 'SAG-R', or the tangential direction first or the sagittal direction first, etc.
4. The position of the optical center may be assumed or stored if available, or the center of image, for example, W/2 and H/2 may be assumed or stored if not available.
5. One or more MTF plots, i.e. at least one MTF plots with respect to each circle, for example, four MTF plots including two MTF plots for two ROIs in the tangential direction and two MTF plots for two ROIs in the sagittal direction as shown in FIG. 8. Here, in the MTF plots, the frequencies are plotted on the x-axis, and the MTF values may be plotted on the y-axis.

Figure 9:
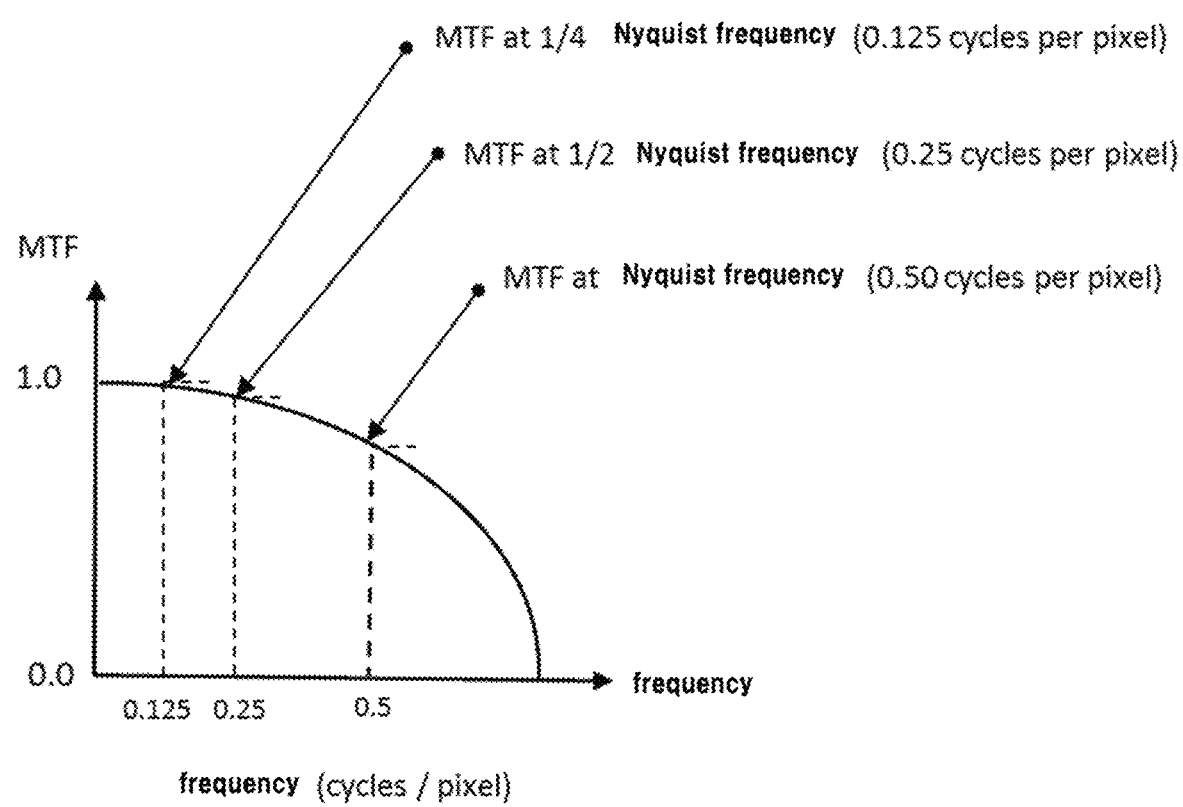
FIG. 9 shows MTF values at specific frequencies, to be stored according to an embodiment of the disclosure.

In this case, the MTF plots, i.e. a total of four curves with respect to each circle may for example be stored as the image blur correction data in a polynomial form, and only part of the MTF plots including at least one of specific frequency values, for example, ¼ Nyquist frequency, ½ Nyquist frequency and Nyquist frequency and corresponding MTF values may be stored as shown in FIG. 9. Further, the MTF plots may be stored with respect to (a) each of one or more ROIs in the tangential and sagittal directions, or (b) average of one or more ROIs in the tangential direction and/or sagittal direction, which are included in each circle.

Further, the image blur correction data may be stored in the form of data calculated from the image blur data, for example, an image sharpening filter. The image sharpening filter may include an anisotropic filter or an isotropic filter. When the isotropic filter is used, the image blur is uniformly reduced in both the tangential and sagittal directions. On the other hand, when the anisotropic filter is used, the image blur is individually reduced in the tangential direction and the sagittal direction. The anisotropic filter may be useful in particular when there is a considerable difference in the image blur between the tangential direction and the sagittal direction.

The image correction processor 40 loads the stored image blur correction data and applies the loaded image blur correction to correction for a second image different from the first image taken by the camera. In this case, the image correction processor 40 may replace or supplement an image correction function provided in the existing image processing unit. By using the stored correction data according to the disclosure, the image blur correction (or image blur calibration, i.e. image sharpening and denoising) is carried out (1) with regard to individual cameras, (2) at the position of each pixel, and (3) in each of the tangential and sagittal direction, thereby optimizing the image resolution.

Figure 3:
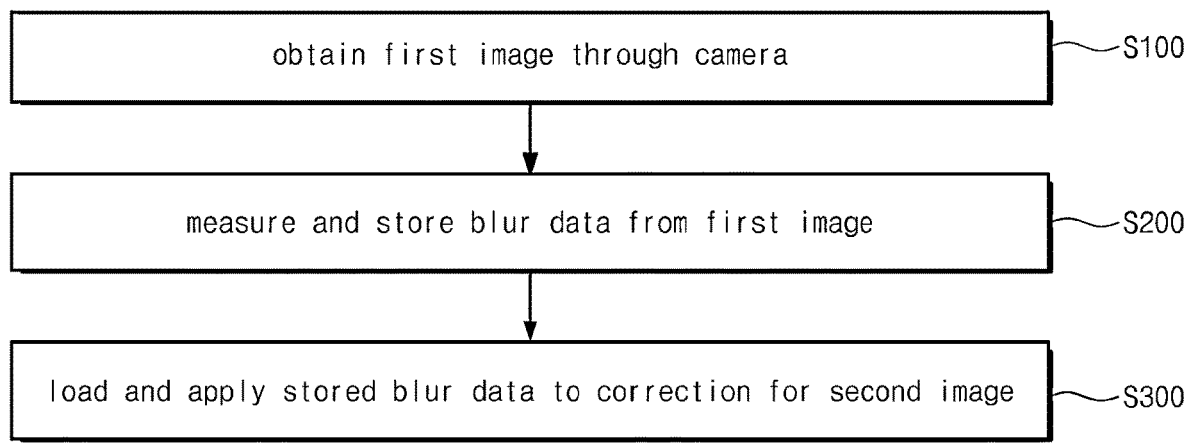
FIG. 3 is a flowchart of an image correction method according to an embodiment of the disclosure.

FIG. 3 is a flowchart of an image correction method according to an embodiment of the disclosure. Regarding the image correction method of the disclosure, repetitive descriptions to the foregoing descriptions of the image correction apparatus according to the disclosure will be avoided.

Referring to FIG. 3, the image correction method of the disclosure includes obtaining a first image by taking a chart, which includes a plurality of circles including one or more ROIs in tangential and sagittal directions, through a camera during a camera manufacturing process (S100); selecting and storing tangential and sagittal image blur correction data of the camera, based on image blur data in the tangential and sagittal directions of the camera measured using the obtained first image (S200); and loading and applying the stored tangential and sagittal image blur correction data to correction for a second image taken by the camera while the camera is operating (S300).

Figure 10:
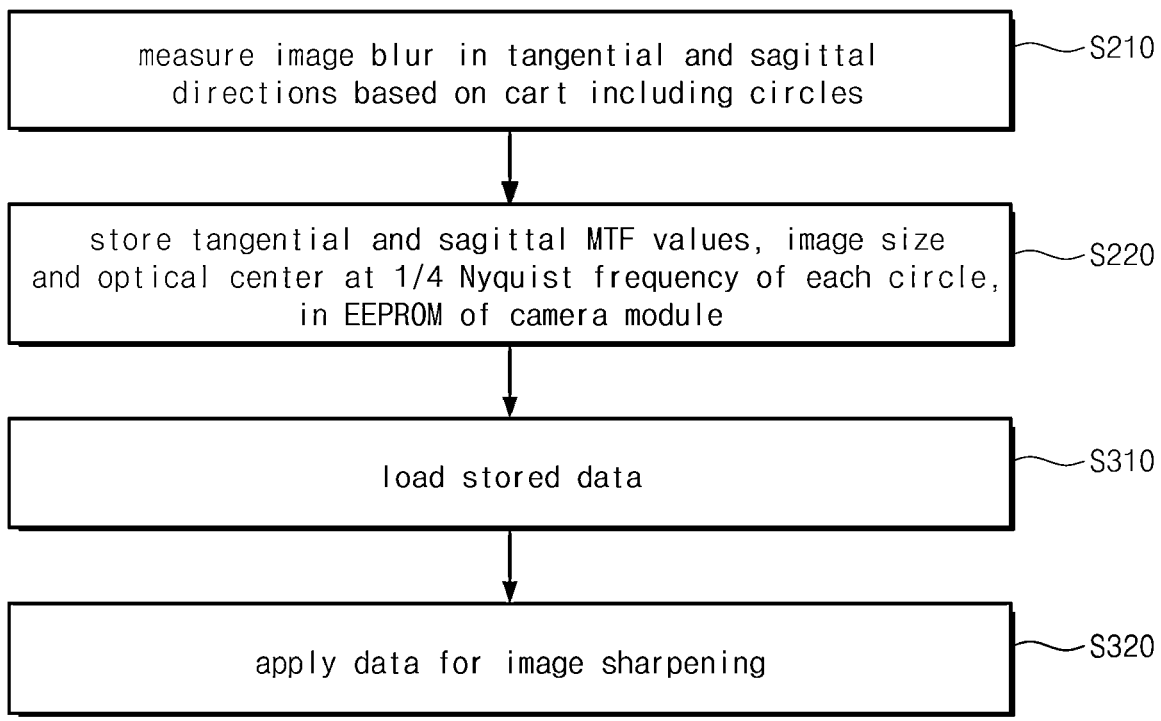
FIG. 10 is a flowchart of an image correction method to be embodied according to an embodiment of the disclosure.

In more detail, referring to FIG. 10 showing a flowchart of an image correction method to be embodied according to an embodiment of the disclosure, a chart is taken as an image through the camera as shown in S100 of FIG. 9 during the camera manufacturing process, and then the blur data, i.e. the MTF plots in the tangential and sagittal directions are obtained from the taken image of the chart (S210), in which the chart may include a plurality of circles, for example, 53 circles.

Based on the obtained MTF plots, a tangential MTF value and a sagittal MTF value at a ¼ Nyquist frequency of each circle, an image size and optical center coordinates are stored in an EEPROM of a camera module (S220), in which the tangential MTF value and the sagittal MTF value of each circle may be an average tangential MTF value and an average sagittal MTF value of a plurality of ROIs. The average tangential and sagittal MTF values may be calculated with respect to different ROIs.

The stored data is loaded to the camera while the camera is operating (S310), and the loaded data is applied for image sharpening optimized to the camera (S320), in which image sharpening strength may be varied depending on the pixel positions based on the loaded data. In this embodiment, the isotropic filter was used for correcting the image blur in both the tangential and sagittal directions.

Figure 11:
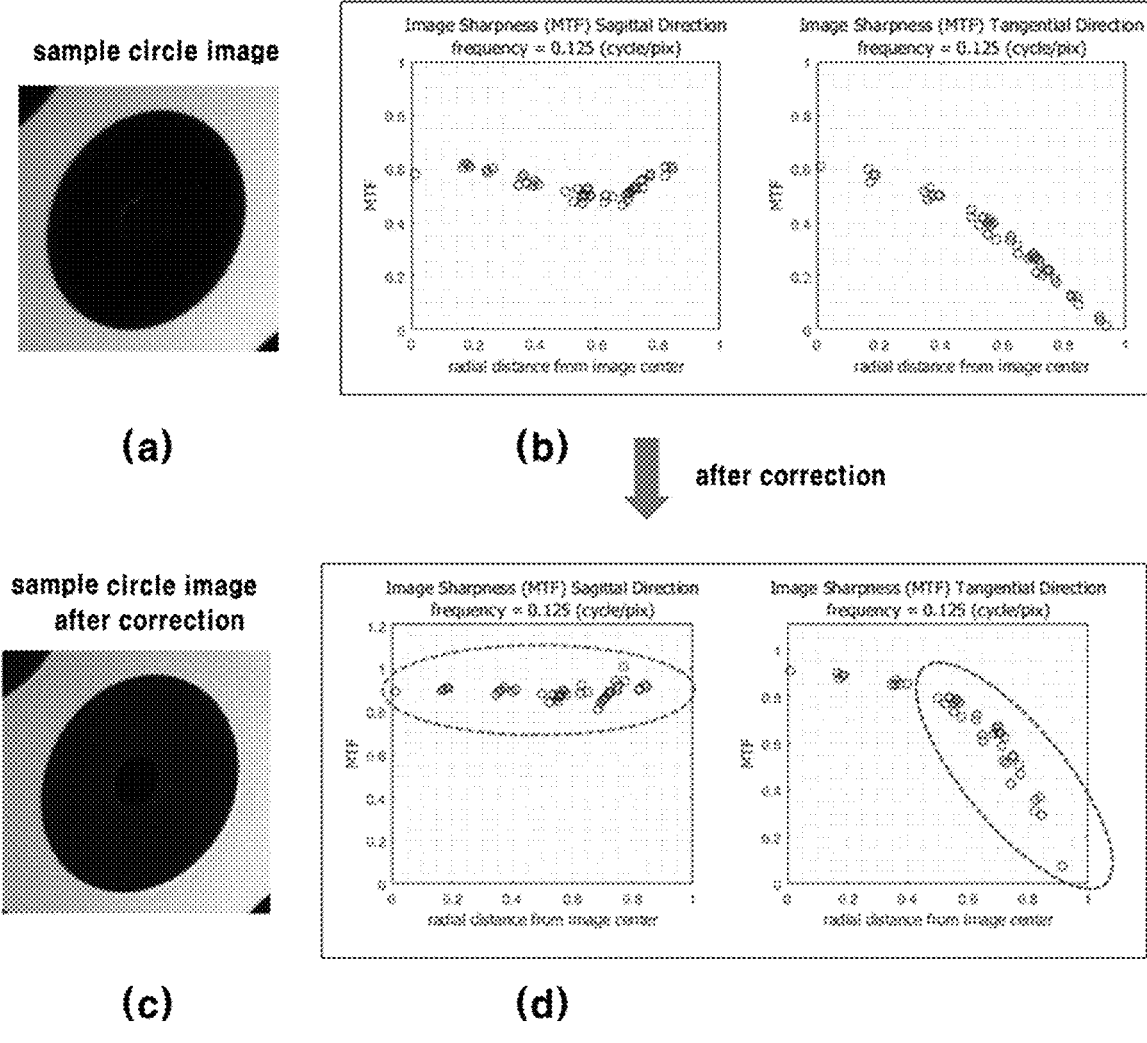
FIG. 11 shows effects of image-blur correction based on implementation examples of the disclosure.

FIG. 11 shows effects of image-blur correction based on implementation examples of the disclosure.

In FIG. 11, (a) shows a sample circle image before correction and (b) shows an MTF plot of distances from the image center before the correction, while (c) shows a sample circle image after the correction and (d) shows an MTF plot of distances from the image center after the correction.

In comparison (a) and (c) of FIG. 11, the image blur was corrected in particular in the sagittal direction, and it was more apparent from comparison between (b) and (d) of FIG. 11. Comparison in the MTF plot in the sagittal direction between (b) and (d) of FIG. 11 shows that the image blur is surely corrected (see the dotted left green circle). On the other hand, comparison in the MTF plot in the tangential direction between (b) and (d) of FIG. 11 shows that the image is corrected but the correction in the tangential direction is less than that in the sagittal direction (see the dotted right red circle). This is because the modulation strength of the isotropic filter is uniformly applied based on the sagittal MTF data and thus the image blur still remains in the tangential direction. Like this, when there is a large difference in the image blur between the tangential direction and the sagittal direction, the anisotropic filter may be used for the correction in each of the tangential and sagittal directions.

The image correction apparatus according to the embodiments of the disclosure may have aspects that are entirely hardware, entirely software, or partially hardware and partially software. For example, the image correction apparatus may collectively refer to hardware capable of processing data and operating software for driving the hardware. In this specification, terms "-er", "-or", "unit", "module", "device", "system" or the like are intended to refer to combination of hardware and software driven by the software. For example, the hardware may be a computing device capable of processing data, which includes a central processing unit (CPU), a graphic processing unit (GPU) or other processors. Further, the software may refer to a running process, an object, an executable, a thread of execution, a program or the like.

Meanwhile, the methods according to embodiments of the disclosure may be at least partially implemented by a computer program, and recorded in a computer-readable recording medium. For example, the methods may be implemented together with a program product configured by a computer-readable medium including a program code, and may be executable by a processor for performing the described certain or all steps, operations or processes.

The computer may be a desktop computer, a laptop computer, a notebook computer, a smartphone, or the like computing device, or may be any device integrated with them. The computer refers to a device that includes one or more replaceable and special-purpose processors, a memory, a storage, and a networking component (either wireless or wired). The computer may for example execute an operating system compatible with Microsoft's Window, Apple OS X or iOS, a Linux distribution, or an operating system such as Google's Android OS.

The program instruction may be collectively called the software, which may include a computer program, a code, an instruction, or combination of one or more among them, and configure the processing devices to operate as desired or issue a command to the processing devices independently or collectively.

Software and/or data may be permanently or temporarily embodied in any type of machine, component, physical device, virtual equipment, computer storage medium or device in order to be interpreted by the processing device or to provide instructions or data to the processing device. The software may be distributed over computing devices connected through a network, and stored or executed in a distributed manner. Software and data may be stored in one or more computer readable recording media.

The computer readable medium may include a program instruction, a data file, a data structure, etc. independently or combination thereof. The program instruction recorded in the medium may be specially designed or configured for embodiments, or publicly known and usable to a person having an ordinary kill in the computer software art. The computer readable recording medium may for example include magnetic media such as a hard disk, a floppy disk, and a magnetic tape; optical media such a CD-ROM, and a DVD; magneto-optical media such a floptical disk; and a ROM, RAM, a flash memory or the like hardware device specially configured to store and implement a program instruction. The program instruction may for example include not only a machine language code made by a compiler but also a high-level language code executable by a computer through an interpreter or the like. The hardware device may be configured to operate as one or more software module to perform an operation according to an embodiment, and vice versa.

In brief, an image correction apparatus and method according to the disclosure performs image correction by taking individual characteristics of the cameras into account, and effectively corrects image distortion due to, in particular, tangential and sagittal image blurs.

The foregoing image correction apparatus and method according to the disclosure has merits that the image correction is performed in consideration of the individual characteristics of the cameras.

Further, the foregoing image correction apparatus and method of the disclosure has merits that image distortion due to, in particular, the tangential and sagittal image blurs is effectively corrected.

The terms used in this disclosure are generally intended as "open" terms in particular in claims (e.g. the bodies of the claims) (for example, "including" needs to be construed as meaning "including without limitations," "having" needs to be construed as meaning "at least having", and "comprising" needs to be construed as meaning "comprising without limitations." When a specific number is intentionally given in claims, the intention is explicitly described in the claims. On the other hand, no explicit description is construed as absence of the intention.

Although only certain features of the disclosure are illustrated and described above, various modifications and changes can be made by those skilled in the art. Therefore, it will be appreciated that claims are intended to include the changes and modifications within the scope of the disclosure.

What is claimed is:

1. An image correction method, implemented in an image correction apparatus that corrects an image taken by a camera, the method comprising:
   obtaining a first image by taking an image of a chart comprising a plurality of circles, each of which comprises one or more sectoral regions of interest (ROIs) in a tangential direction and a sagittal direction, through the camera;
   selecting and storing tangential and sagittal image blur correction data of the camera in a nonvolatile memory of the camera, at a time of camera calibration, based on image blur data in the tangential and sagittal directions of the camera measured using the obtained first image, the image blur data in the tangential and sagittal directions of the camera being measured based on the one or more sectoral ROIs; and loading the stored tangential and sagittal image blur correction data and applying the loaded tangential and sagittal image blur correction data to reduce or eliminate image blur along sagittal and tangential directions on a second image taken by the camera in use, wherein the second image is different from the first image.

2. The image correction method according to claim 1, wherein the tangential and sagittal image blur correction data comprises:
with respect to each of the plurality of circles,
(i) a center position of the corresponding circle;
(ii) center positions of one or more sectoral ROIs in the tangential direction and the sagittal direction, included in the corresponding circle, selectively; and
(iii) one or more modulation transfer function (MTF) plots comprising MTF values at spatial frequencies.

3. The image correction method according to claim 2, wherein the one or more MTF plots are generated based on (a) each of one or more sectoral ROIs in the tangential and sagittal directions or (b) average of one or more sectoral ROIs in the tangential direction and/or sagittal directions, included in each circle.

4. The image correction method according to claim 3, wherein each MTF plot of the one or more MTF plots comprises part of the MTF plot comprising specific frequencies and MTF values corresponding to the specific frequencies.

5. The image correction method according to claim 4, wherein the specific frequency value comprises at least one of a ¼ Nyquist frequency, a ½ Nyquist frequency, and a Nyquist frequency.

6. The image correction method according to claim 1, wherein the tangential and sagittal image blur correction data comprises:
(i) an image size;
(ii) an optical center position; and
(iii) with respect to each of the plurality of circles, one or more MTF plots comprising an MTF average value of one or more sectoral ROIs in the tangential direction and sagittal direction at a ¼ Nyquist frequency.

7. The image correction method according to claim 1, wherein the tangential and sagittal image blur data comprises:
with respect to each of the plurality of circles,
(i) a center position of the corresponding circle;
(ii) center positions of one or more sectoral ROIs in the tangential direction and the sagittal direction, included in the corresponding circle, selectively; and
(iii) one or more MTF plots comprising MTF values at spatial frequencies,
the tangential and sagittal image blur correction data being stored as an image sharpening filter calculated based on the tangential and sagittal image blur data.

8. An image correction apparatus comprising:
an image acquirer configured to obtain a first image by taking an image of a chart comprising a plurality of circles, each of which comprises one or more sectoral regions of interest (ROIs) in a tangential direction and a sagittal direction, through the camera;
an image correction data generator configured to select and store tangential and sagittal image blur correction data of the camera in a nonvolatile memory of the camera, at a time of camera calibration, based on image blur data in the tangential and sagittal directions of the camera measured using the obtained first image, the image blur data in the tangential and sagittal directions of the camera being measured based on the one or more sectoral ROIs; and an image correction processor configured to load the stored tangential and sagittal image blur correction data and apply the loaded tangential and sagittal image blur correction data to reduce or eliminate image blur along sagittal and tangential directions on a second image taken by the camera in use, wherein the second image is different from the first image.

9. The image correction apparatus according to claim 8, wherein the tangential and sagittal image blur correction data comprises:
with respect to each of the plurality of circles,
(i) a center position of the corresponding circle;
(ii) center positions of one or more sectoral ROIs in the tangential direction and the sagittal direction, included in the corresponding circle, selectively; and
(iii) one or more modulation transfer function (MTF) plots comprising MTF values at spatial frequencies.

10. The image correction apparatus according to claim 9, wherein the one or more MTF plots are generated based on (a) each of one or more sectoral ROIs in the tangential and sagittal directions or (b) average of one or more sectoral ROIs in the tangential direction and sagittal directions, included in each circle.

11. The image correction apparatus according to claim 10, wherein each MTF plot of the one or more MTF plots comprises part of the MTF plot comprising specific frequencies and MTF values corresponding to the specific frequencies.

12. The image correction apparatus according to claim 11, wherein the specific frequency value comprises at least one of a ¼ Nyquist frequency, a ½ Nyquist frequency, and a Nyquist frequency.

13. The image correction apparatus according to claim 8, wherein the tangential and sagittal image blur correction data comprises:
(i) an image size;
(ii) an optical center position; and
(iii) with respect to each of the plurality of circles, one or more MTF plots comprising an MTF average value of one or more sectoral ROIs in the tangential direction and sagittal direction at a ¼ Nyquist frequency.

14. The image correction apparatus according to claim 8, wherein the tangential and sagittal image blur data comprises:
with respect to each of the plurality of circles,
(i) a center position of the corresponding circle;
(ii) center positions of one or more sectoral ROIs in the tangential direction and the sagittal direction, included in the corresponding circle, selectively; and
(iii) one or more MTF plots comprising MTF values at spatial frequencies,
the tangential and sagittal image blur correction data being stored as an image sharpening filter calculated based on the tangential and sagittal image blur data.

15. A non-transitory computer-readable storage medium recorded with a program for implementing the method according to claim 1.

* * * * *